United States Patent [19]
Rabin et al.

[11] Patent Number: 5,129,801
[45] Date of Patent: Jul. 14, 1992

[54] FABRICATION OF HIGH TEMPERATURE MATERIALS BY EXOTHERMIC SYNTHESIS AND SUBSEQUENT DYNAMIC CONSOLIDATION

[75] Inventors: Barry H. Rabin, Idaho Falls; Gary E. Korth, Blackfoot; Richard N. Wright; Richard L. Williamson, both of Idaho Falls, all of Id.

[73] Assignee: The United States of America as represented by the United States Department of Energy, Washington, D.C.

[21] Appl. No.: 641,945

[22] Filed: Jan. 16, 1991

[51] Int. Cl.$^5$ .............................. B22F 3/08
[52] U.S. Cl. .......................... 425/1; 72/706; 264/84; 422/165; 425/DIG. 15
[58] Field of Search ............... 425/1, DIG. 15, 416, 425/423; 264/84; 72/706; 422/165, 166

[56] References Cited

U.S. PATENT DOCUMENTS

| | | | |
|---|---|---|---|
| 2,648,125 | 8/1953 | McKenna et al. | 264/84 |
| 2,948,923 | 8/1960 | LaRocca et al. | 425/1 |
| 3,157,498 | 11/1964 | Zernow et al. | 264/84 X |
| 3,220,103 | 11/1965 | Simons | 425/1 X |
| 3,328,841 | 7/1967 | Brayman | 425/1 |
| 3,344,209 | 9/1967 | Hague et al. | 264/84 X |
| 3,346,914 | 10/1967 | Sandstrom et al. | 425/1 X |
| 3,363,037 | 1/1968 | Levey, Jr. et al. | 425/1 X |
| 3,608,014 | 9/1971 | Balchan et al. | 264/84 |
| 3,645,435 | 2/1972 | Doherty, Jr. et al. | 425/1 X |
| 3,980,413 | 9/1976 | Kononenko et al. | 425/1 |
| 4,106,970 | 8/1978 | Torbet et al. | 425/1 X |
| 4,658,629 | 4/1987 | Milisavljevic | 72/706 X |

Primary Examiner—Richard L. Chiesa
Attorney, Agent, or Firm—James W. Weinberger; Thomas G. Anderson; William R. Moser

[57] ABSTRACT

An apparatus for synthesizing a composite material such as titanium carbide and alumina from exothermic reaction of a sample followed by explosive induced consolidation of the reacted sample. The apparatus includes a lower base for holding a powdered composite sample, an igniter and igniter powder for igniting the sample to initiate an exothermic reaction and a piston for dynamically compressing the sample utilizing an explosive reaction.

17 Claims, 6 Drawing Sheets

FABRICATION OF HIGH TEMPERATURE MATERIALS BY EXOTHERMIC SYNTHESIS AND SUBSEQUENT DYNAMIC CONSOLIDATION

CONTRACTUAL ORIGIN OF THE INVENTION

The U.S. Government has rights in this invention pursuant to Contract No. DE-AC07-76ID01570 between the U.S. Department of Energy and EG&G Idaho, Inc..

FIELD OF THE INVENTION

This invention relates to a process and apparatus for synthesizing and consolidating high temperature materials by exothermically reacting constituent powders and dynamically compressing the hot reacted product by an explosively generated compression pulse.

BACKGROUND OF THE INVENTION

The synthesis of high temperature materials by exothermic reaction is well known in the art. This process offers the potential for cost reductions during material fabrication. In general, a problem with this process is that the reactant products are porous and have to be consolidated in a subsequent step. This compromises the advantages of the overall process. Several approaches have heretofore been devised for applying pressure either during or immediately following the exothermic reaction to promote densification in a single step. These approaches typically require expensive equipment such as a hot press; and, once again, the cost advantages of the exothermic synthesis approach are sacrificed.

Materials fabricated in accordance with this process have a wide range of applications in energy, aerospace, and defense systems. Components fabricated by this process, for instance, have improved physical properties and high strength-to-weight ratios. For instance, a dispersed phase composite, such as alumina ($Al_2O_3$) reinforced with approximately 30 percent by weight of titanium carbide (TiC), exhibits good electrical conductivity, as well as high hardness, strength, and fracture toughness. This desirable combination of properties makes this type of composite useful, primarily for ceramic cutting tool applications. In spite of the obvious advantages of using these materials, however, their utilization has been limited by the difficulty and expense of fabrication. Additional and expensive equipment and processes are required to obtain materials with closed porosity.

Commercially available $TiC$-$Al_2O_3$ composites are generally fabricated by hot pressing powder mixtures at temperatures above 1600° C. Alternatively, a number of recent investigations have demonstrated that pressureless sintering at temperatures in excess of 1800° C. can be used to attain closed porosity. After final densification by subsequent hot isostatic pressing, the properties are comparable to hot pressed materials. Although this procedure lends itself to near net shape forming, processing costs are still high due to the need for hot isostatic pressing.

Preparation of composites by exothermic reaction has been extensively investigated in the art. There has been limited success, however, in producing densified, useful materials. Additionally, there have been prior art efforts to combine exothermic synthesis with dynamic consolidation in a single process route. Although this approach has been partially successful, it has not heretofore achieved the results necessary for successful commercial fabrication of such materials.

The development of new, cost effective fabrication techniques for improved composite materials has been identified as a strong national need by several federal agencies including the Department Of Energy (DOE) (energy savings during fabrication and through use in transportation/conversion systems), NASA (advanced airframe development), Department Of Defense (DOD) (composite armor materials, advanced aircraft, weight reduction in defense systems), and Bureau Of Mines (BOM) (high temperature, wear-resistant materials).

In an effort to produce such composite materials, a new processing approach has been developed in accordance with the present invention. This approach combines the techniques of combustion synthesis and dynamic consolidation utilizing explosive-forming techniques to fabricate composites rapidly in a single processing operation. Composites such as $TiC$-$Al_2O_3$ mixtures can be produced by exothermic reaction using low cost reactants. The expense of high cost starting powders is also eliminated. Additionally, since the cost of explosives and experimental assemblies is low compared to hot pressing or hot isostatic pressing facilities and because full densification is possible without any external heating source, the overall processing costs are relatively low.

SUMMARY OF THE INVENTION

In accordance with the present invention, an apparatus and method for fabrication of composite materials by means of exothermic synthesis and subsequent dynamic consolidation is provided. In general, the apparatus of the invention comprises a consolidation chamber which broadly stated includes: means for holding a powdered composite material sample, means for igniting the sample within a reaction chamber to initiate an exothermic reaction, and means for dynamically compressing the sample within the reaction chamber utilizing an explosive reaction.

The process of the invention broadly stated comprises:

placing a sample in the form of a cylindrical pellet into the consolidation chamber;
igniting the pellet to cause an exothermic reaction; and
dynamically consolidating the pellet utilizing an explosive reaction.

In a preferred form of the invention, the consolidation chamber is formed with a main body. A reactant sample of a powdered composite mixture is placed within a reaction chamber of the main body. Exothermic synthesis is accomplished by causing ignition of an igniter powder that is contained within the body adjacent the reactant sample. Dynamic consolidation is provided by subsequent compressing of the hot pellet by means of movement under explosive force of a piston into the reaction chamber.

In a first embodiment, the dynamic consolidation is accomplished by a moving body compressing a pellet against a stationary piston. An alternate and preferred embodiment includes a moving piston within the body, compressing the pellet against a stationary base. The reaction chamber includes thermal insulation and high structural strength, and is constructed to minimize friction between moving parts.

Other objects, advantages, and capabilities of the present invention will become more apparent as the description proceeds.

DETAILED DESCRIPTION OF THE INVENTION

As used herein, the term "exothermic synthesis" refers to the formation of a compound through a heat-liberating reaction between powder constituents. The process produces a variety of useful composites and is characterized by self-heating, inexpensive raw materials, low-cost equipment, and short processing times. Prior art attempts to prepare materials by exothermic reaction have resulted in porous products which had to be further processed by conventional means. In accordance with the present invention, dynamic consolidation is accomplished immediately following exothermic synthesis of the powder constituents to produce a non-porous material.

Figure 1:
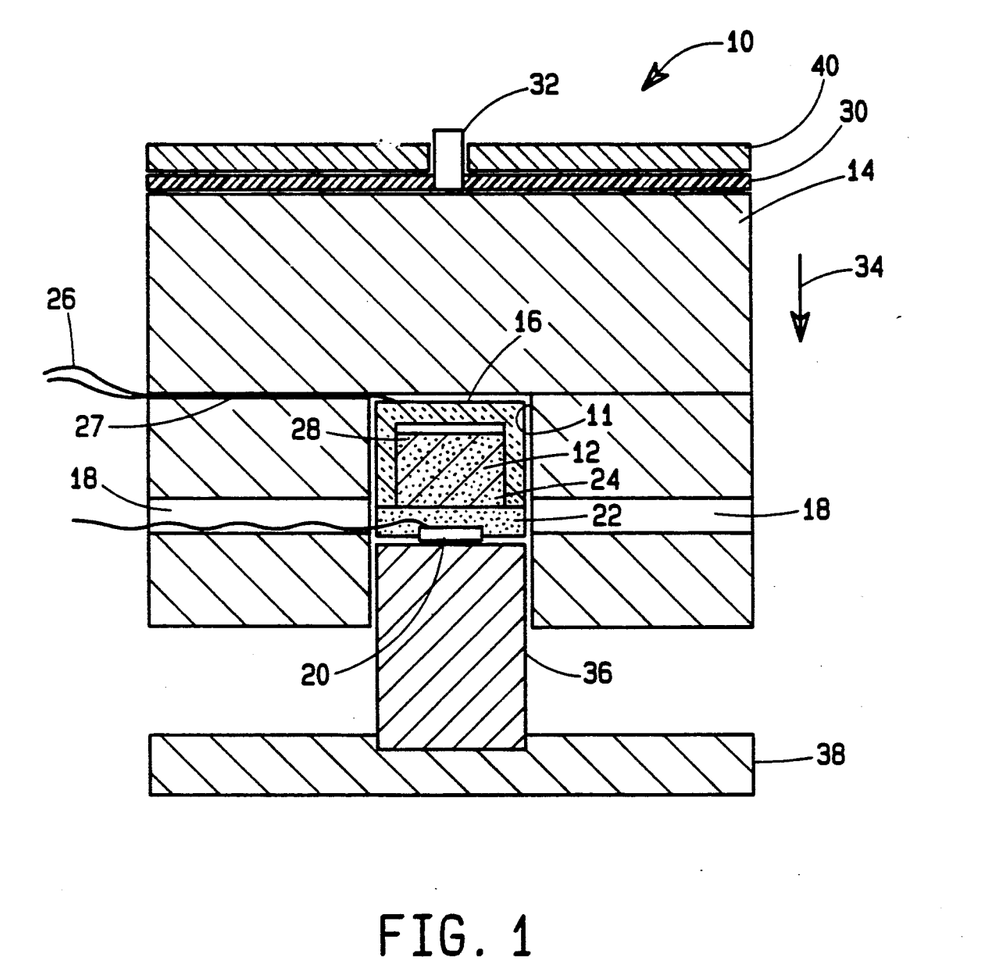
FIG. 1 is a schematic drawing of a dynamic consolidation chamber constructed in accordance with the invention.

Referring now to FIG. 1, a consolidation chamber 10 constructed in accordance with the invention and suitable for dynamic consolidation of materials formed by high temperature exothermic synthesis is shown. The consolidation chamber broadly stated comprises: means for holding a material sample, means for igniting the sample to initiate an exothermic reaction, and means for dynamically compressing the sample utilizing an explosive reaction after the exothermic reaction.

In an illustrative embodiment of the invention, commercially available reactants of titanium oxide ($TiO_2$), aluminum (Al), and carbon (C) are used to synthesize titanium carbide and alumina (TiC-$Al_2O_3$) according to the following reaction:

$$3TiO_2 + 4Al + 3C \rightarrow 3TiC + 2Al_2O_3.$$

The $TiO_2$ is reagent grade rutile or anatase from Fisher Scientific, the aluminum is commercially pure inert gas atomized powder from Valimet Inc., and the carbon source is acetylene black from Chevron Chemical. The nominal particle sizes of the $TiO_2$, Al, and C are about 0.2, 10, and 0.02 micrometers ($\mu$m), respectively.

The reactants are prepared by wet milling a stoichiometric powder mixture in ethanol for about 24 hours using alumina milling balls. After drying, the powder is milled for 1 hour and then screened to about $-150$ $\mu$m. Cylindrical pellets approximately 25 mm in diameter by 22 mm in height were uniaxially pressed without binder at 20 MPa, resulting in a green (unfired) density of approximately 1.82 g/cm$^3$. The pellets are then stored in a drying oven held at about 70° C.

With reference to FIG. 1, the consolidation chamber includes: means for holding a material sample 12 in the form of a reaction chamber 11 formed in a cylindrical, movable main body 14; means for igniting the sample 12 in the form of an igniter 20 and igniter powder 22; and means for dynamically compressing the sample in the form of an explosive sheet 30 for forcing the main body 14 and sample 12 against a stationary cylindrical piston 36.

The reaction chamber 11 is thermally insulated from the body 14 on the top and two sides by a layer (i.e., about 2.5 mm) of porous zirconia felt 16. Vent apertures 18 are provided through the body 14 to allow hot gases to escape during the exothermic reaction.

The ignition means comprises an igniter 20 such as a model rocket igniter and a charge (e.g., 1-2 grams) of an igniter powder 22 such as loose boron (B) and titanium (Ti). Ignition of the igniter powder 22 initiates an exothermic reaction at the lower end 24 of the powder pellet 12. Reaction throughout the entire pellet 12 is detected by a thermocouple 26 placed within a thermocouple aperture 27 adjacent an upper end 28 of the pellet 12.

The reacted sample 12 is allowed to thermally equilibrate and degas for a few seconds. The self-heated reaction products are then dynamically consolidated by ignition of the sheet explosive 30 by a blasting cap 32. The sheet explosive 30 is mounted to a tamper plate 40.

Ignition of the sheet explosive initiates a downward compression pulse (as indicated by arrow 34) in the body 14. The body 14 containing the sample pellet 12 is then driven onto the piston 36 by the sheet explosive charge 30. The length of the piston 36 is chosen such that it compresses the sample to full density just as the body 14 impacts a lower base plate 38 on which the piston 36 is mounted.

Numerical simulations of the sheet explosive 30, weight of the tamper plate 40, and the body 14 can be used, as is apparent to those skilled in the art, as a design aid and to predict the stress conditions in the body 14 during consolidation. The inventor has determined that, in general, after ignition, all of the recited components are reusable with the exception of the tamper plate 40.

Figure 2:
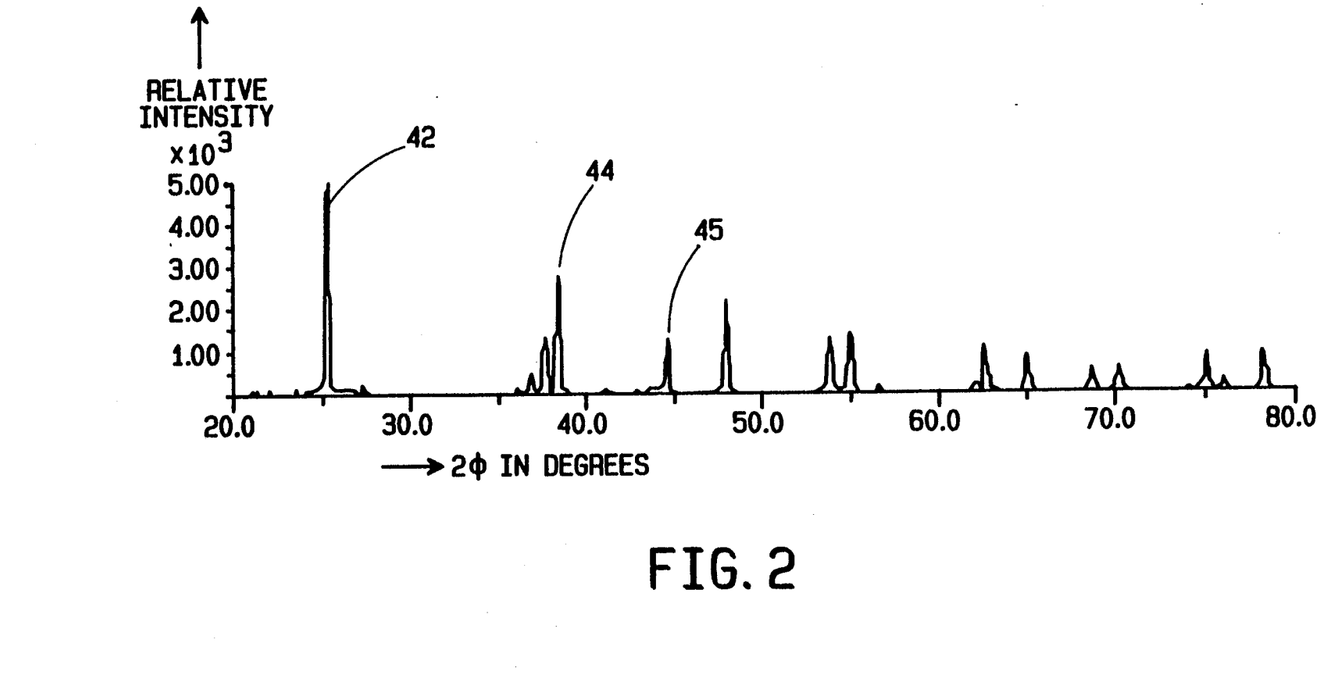
FIG. 2 is a graph of intensity versus diffraction angle of a starting powder illustrating $TiO_2$, C, and Al reactants.
Figure 3:
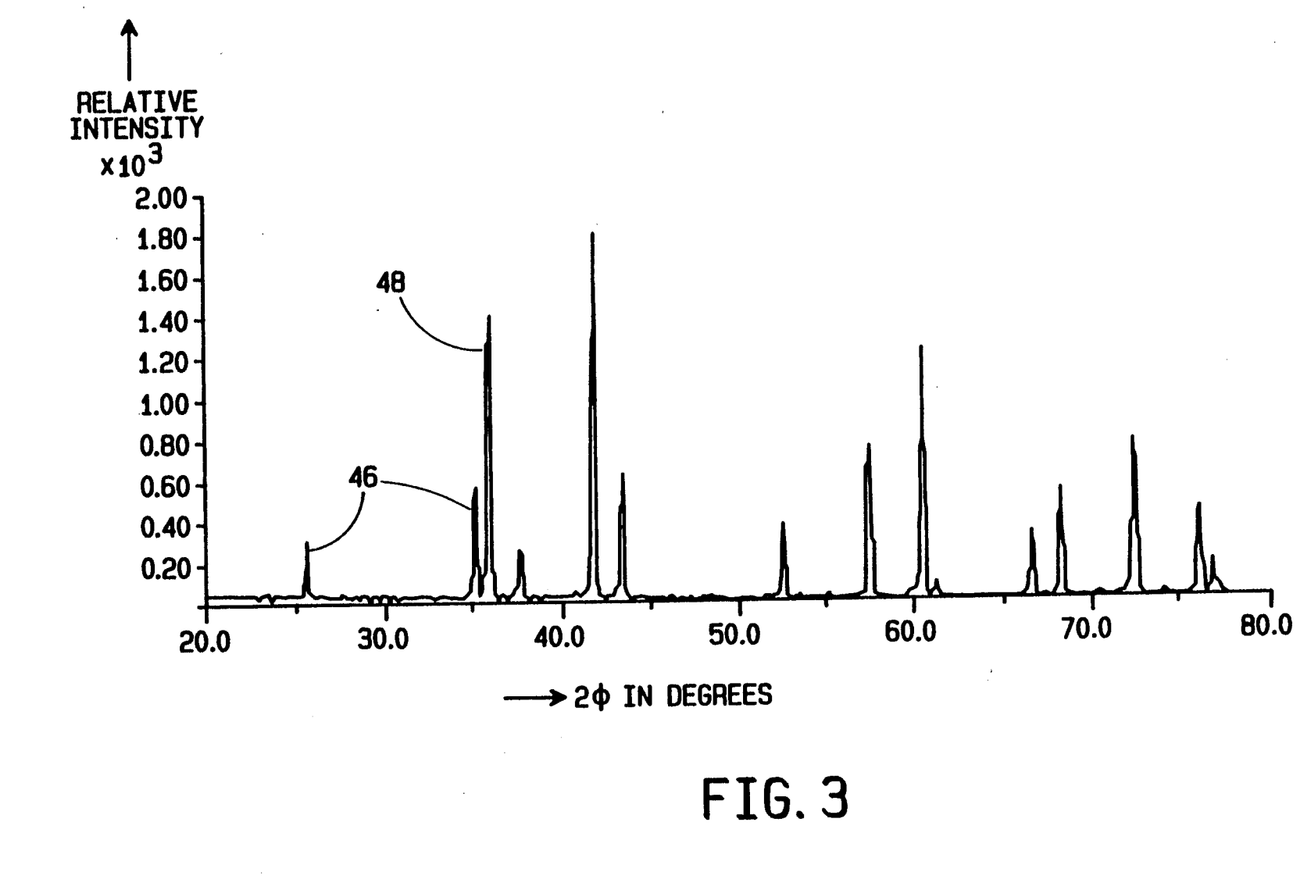
FIG. 3 is a graph of intensity versus diffraction angle, illustrating complete conversion of reactants into a TiC + $Al_2O$ composite.

Referring now to FIGS. 2 and 3, x-ray diffraction can be used to confirm the extent of the reaction. This method determines the constituents of the reactant compounds by measuring the relative reflected x-ray beam intensity after reflection from the sample material surface. The diffraction occurring is a function of the crystalline structure and is, therefore, unique to each crystal compound. The angle of incidence $\phi$ equals that angle of reflectance $\phi^1$, so that the total angle is $2\phi$ as shown in the abscissa of FIGS. 2 and 3. The reflectance varies as the total angle differs for different compounds. By comparing the peaks of the starting compound of FIG. 2 with the peaks after dynamic consolidation of FIG. 3, it is noted they do not occur at similar angles. Each peak of FIG. 2 and 3 can be attributed to a particular compound. That is, the first peak 42 on FIG. 2 at 25° occurs due to $TiO_2$, compound in the starting powder; the second major peak at 44 occurring at 38° is due to the aluminum in the starting compound; the third peak at 45 occurring at 44.5° is due to the graphite or carbon (C) element in the powder.

Referring now to FIG. 3, this figure illustrates the compounds occurring after reaction and consolidation. The first and second peaks 46 occurring at 25.5° and 35° are due to the $Al_2O_3$ in the composite and the third peak 48 at 36° is due to the TiC. A careful inspection of the remaining peaks will reveal that those of FIG. 2 do not coincide with those of FIG. 3.

Figure 4:
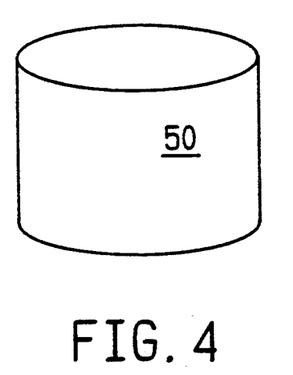
FIG. 4 is a perspective view of a pressed pellet prior to reaction.
Figure 5:
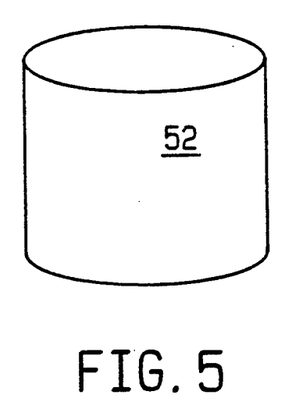
FIG. 5 is a perspective view of a pressed pellet after exothermic reaction and without explosive consolidation.
Figure 6:
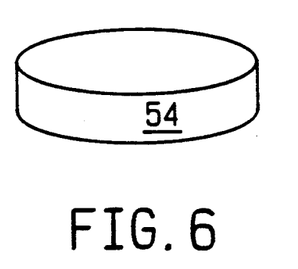
FIG. 6 is a perspective view of a pressed pellet after reaction and consolidation.

FIG. 4 compares the appearance of a sample 50 before reaction with FIG. 5 a sample 52 after reaction formed on the laboratory bench without applied pressure and, finally, with FIG. 6 sample 54 formed after reaction followed by dynamic consolidation. Samples reacted on a laboratory bench exhibited swelling and resulted in products containing over 50% porosity. Application of the dynamic compression pulse to the hot sample resulted in densification as shown by FIG. 6.

The dynamically consolidated composites were recovered intact; however, in some investigations, microcracks were observed in the specimens. This is believed to be thermal shock induced cracking occurring during rapid cooling of the sample from high temperature. During consolidation the zirconia felt 16 was compressed to a nil thickness allowing intimate contact with the metal fixture. This problem has been corrected by lining the reaction chamber 11 with an insulating material such as phenolic resin or hardwood, such as oak, that retains insulting properties during consolidation as will hereinafter be described.

In use of the apparatus and process of the invention, dynamically compressed samples in the range of from about 85% to over 95% of theoretical density can be obtained. The highest density can be achieved by allowing the hot sample to degas and equilibrate for about 5 seconds after the reaction and by using a stress amplitude calculated to be approximately 1 Gpa at the bottom of the explosive driving means. Samples formed according to the invention are well bonded and exhibit a fine, interconnected composite microstructure. The Vickers microhardness of such a sample was variable and ranged between 18-22 GPa. This is typical of the values reported for $TiC-Al_2O_3$ materials processed by other methods. Most of the porosity was large and spherical, indicating that gases may have been trapped within the compact. Degassing of green compacts by heating in vacuum, prior to initiation of the exothermic reaction, can considerably reduce the quantity of gases evolved and allows higher densities to be achieved.

Figure 7:
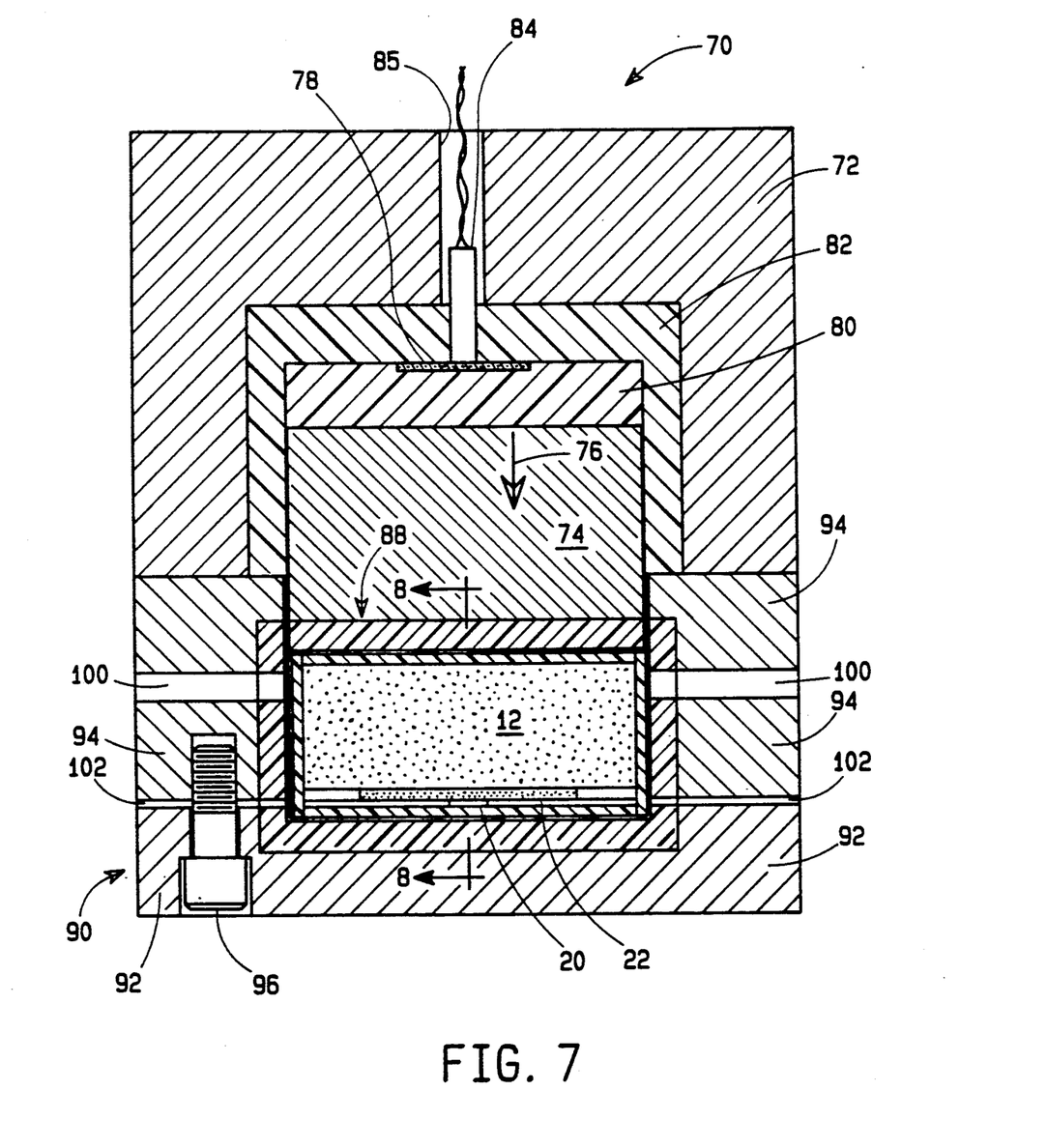
FIG. 7 is a side sectional view of a consolidation chamber in a preferred embodiment of the invention.

Referring now to FIG. 7, an alternate embodiment of the consolidation chamber 70 is shown. In the alternate embodiment, a body 72 of the consolidation chamber 70 is stationary and a piston 74 is driven in a downward direction as indicated by arrow 76 by sheet explosive 78 acting on a polyethylene cap 80. The piston 74 is contained within a polyethylene liner 82 which acts as a hearing surface against the piston walls. As in the previous embodiment, a blasting cap 84 contained within a top aperture 85 of body 72 is used to ignite the sheet explosive 78.

A base 90 comprising a base cap 92 and base cylinder 94 is attached by fasteners 96 to the body 72. In this embodiment, the base 90 has upper vent apertures 100 for venting prior to piston 74 downward motion (arrow 76), and lower vent apertures 102, for venting gases after piston 74 down motion covers the vents 100, as it compresses the sample pellet 12.

Figure 8:
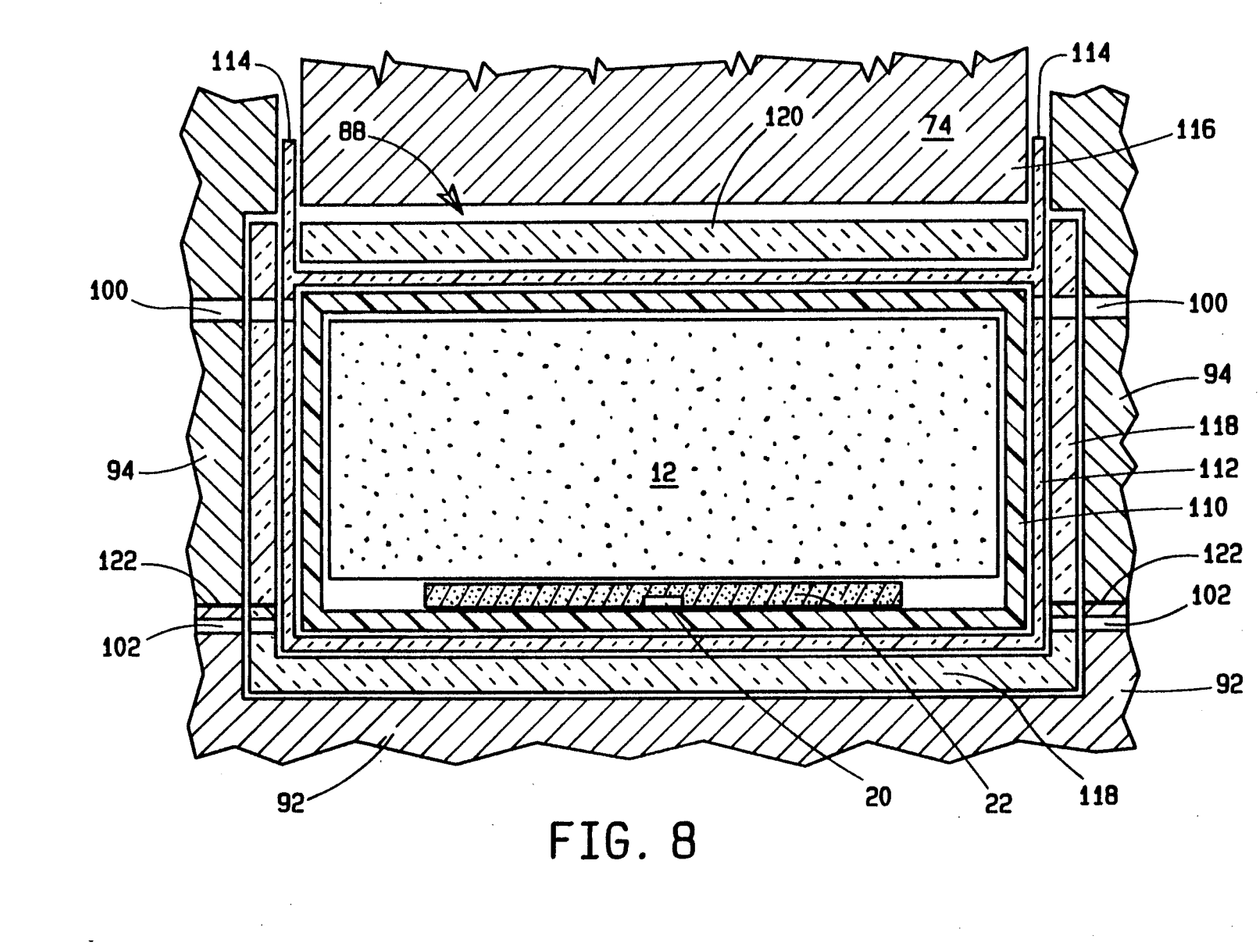
FIG. 8 is a sectional view taken through lines 8—8 of FIG. 7.

Referring now to FIG. 8, the container system 88 is held within the base 90 and comprises an inner polyethylene cylinder 110. The cylinder 110 is enclosed by a graphite insulating cylinder 112, having a skirt (bearing surface) 114 extending up to bear against a lower portion 116 of piston 74. Both cylinders 110 and 112 are retained within a hard insulating outer cylinder 118, having separate top section 120 contained within skirt 114. This hard insulating section 118 can be constructed of a phenol resin or handwood such as oak. Removal of the consolidated sample and insertion of the pellet is accomplished by removing fasteners 96 (FIG. 8) and separating the base cap 92 from the base cylinder 94 at joint 122.

Operation of this embodiment in FIG. 7 and 8 is similar to that of FIG. 1. The igniter 20 causes ignition of the igniter powder 22 which initiates exothermic reaction through pellet 12. After between 5 and 30 seconds, the blast cap 84 is ignited causing the explosive sheet 78 to drive down piston 74, thereby consolidating the three cylinder top portions and sample pellet 12, while the sample pellet 12 is still hot from the exothermic reaction.

It has been demonstrated that it is feasible to fabricate near theoretical density composites of $TiC-Al_2O_3$ from low-cost reactants using the combined techniques of combustion synthesis and dynamic consolidation of the invention. The apparatus and method of the invention offers an economically attractive alternative to processing techniques which require hot pressing or hot isostatic pressing.

It is apparent from the foregoing that a simple yet unobvious exothermic synthesis and dynamic consolidation apparatus has been provided. While the presently preferred embodiment has been described in detail, as will be apparent to those familiar with the art, certain changes and modifications can be made without departing from the scope of the invention as defined by the following claims.

What is claimed is:

1. An apparatus for fabrication of composite materials from a sample pellet comprising:
   a. means for holding the sample pellet in a reaction chamber, said chamber having an insulated cylinder therein;
   b. an igniter and an igniter powder adjacent to the holding means for igniting the sample pellet to provide an exothermic reaction;
   c. a thermocouple adjacent an upper end of the sample pellet; and
   d. dynamic consolidation means attached to said holding means and comprising a piston and a body wherein relative motion between said piston and said body by explosive force compresses the pellet following the exothermic reaction, thereby forming a reactant compound.

2. The apparatus as recited in claim 1 and wherein:
   the body contains the reaction chamber and is movable to contact the piston.

3. The apparatus as recited in claim 2 and wherein:
   the body movement is activated by a sheet explosive adjacent said body, thereby driving said body downward over the piston.

4. The apparatus as recited in claim 3 and wherein:
   the insulating cylinder is zirconia felt inserted adjacent the reaction chamber between said body and the pellet.

5. The apparatus as recited in claim 4 and wherein:

the body has at least one vent aperture extending from a pellet area to an outer periphery of the body 6. The apparatus as recited in claim 1 and wherein: the piston is slidably retained within the body and the sample pellet is retained within a base.

7. The apparatus as recited in claim 6 and wherein: the base further comprises a base cap securely affixed by fastener means to a base cylinder.

8. The apparatus as recited in claim 7 and wherein: the sample pellet is contained within a cylinder of zirconia felt which in turn is within a graphite cylinder, contained within a cylinder of hardwood, supported by said base.

9. The apparatus as recited in claim 8 and wherein: the cylindrical body has a polyethylene lined aperture in a lower portion of the body surrounding the piston.

10. The apparatus as recited in claim 9 and wherein the dynamic consolidation means further comprises:
 a. a sheet explosive;
 b. a polyethylene cap adjacent the explosive;
 c. a blasting cap supported above the polyethylene cap within the cylindrical body, such that activation of blasting cap drives the polyethylene cap and piston against the pellets.

11. The apparatus as recited in claim 1 and wherein: the igniter powder is a mixture of titanium and boron.

12. The apparatus as recited in claim 1 and wherein: the sample pellet consists of a powder mixture of titanium oxide, carbon, and aluminum.

13. An apparatus for fabrication of high density composite materials from a sample pellet comprising:
 a. a cylindrical body having an insulated cylinder therein;
 b. a movable piston within the body;
 c. a base adjacent the cylindrical body containing the pellet and an igniter powder and igniter within a reaction chamber; and
 d. a dynamic consolidation means contained within the body for compressing the sample pellet under an explosive force whereby pellet exothermic synthesis is activated by the igniter and igniter powder followed by dynamic consolidation by the consolidation means thereby forming a reactant compound.

14. The apparatus as recited in claim 13 wherein the dynamic consolidation means further comprises:
 a. a blast cap contained within a top aperture in the body;
 b. a sheet explosive adjacent the blast cap and body top aperture;
 c. a polyethylene cap adjacent the sheet explosive and above the piston; and
 wherein the blast cap and sheet explosive actuation drives the piston against a pellet container system following exothermic consolidation.

15. The apparatus as recited in claim 14 and wherein the pellet container system further comprises:
 a. a polyethylene cylinder containing the pellet and igniter powder;
 b. a graphite cylinder containing the polyethylene cylinder; and
 c. a hard insulating cylinder containing the graphite cylinder.

16. The apparatus as recited in claim 15 and wherein: the hard insulating cylinder is oak wood.

17. The apparatus as recited in claim 15 and wherein: the hard insulating cylinder is phenolic resin.

* * * * *